(12) United States Patent
Kim et al.

(10) Patent No.: US 8,139,937 B2
(45) Date of Patent: Mar. 20, 2012

(54) AUTOMATIC OPTICAL POWER CONTROL METHOD FOR OLT IN PON

(75) Inventors: Sung-Chang Kim, Gwangju (KR); Bin-Yeong Yoon, Daejeon (KR); Yong-Tae Kim, Daejeon (KR); Geun-Yong Kim, Gyeonggi-do (KR); Bong-Tae Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 461 days.

(21) Appl. No.: 12/443,416

(22) PCT Filed: Sep. 21, 2007

(86) PCT No.: PCT/KR2007/004678
§ 371 (c)(1),
(2), (4) Date: Mar. 27, 2009

(87) PCT Pub. No.: WO2008/038981
PCT Pub. Date: Apr. 3, 2008

(65) Prior Publication Data
US 2010/0008667 A1  Jan. 14, 2010

(30) Foreign Application Priority Data
Sep. 29, 2006 (KR) .................. 10-2006-0096421

(51) Int. Cl.
*H04B 10/08* (2006.01)
*H04B 10/20* (2006.01)
*H04B 10/04* (2006.01)
*H04J 14/08* (2006.01)

(52) U.S. Cl. ............. 398/38; 398/58; 398/100; 398/197
(58) Field of Classification Search ............ 398/38, 398/25, 9, 66–72, 208, 58, 197, 162, 98–100
See application file for complete search history.

(56) References Cited

U.S. PATENT DOCUMENTS
2002/0027690 A1*  3/2002  Bartur et al. .................. 359/152
2007/0023615 A1*  2/2007  Ruegg et al. ............... 250/214 R
2007/0140691 A1*  6/2007  Gao et al. ........................ 398/38

FOREIGN PATENT DOCUMENTS
| EP | 0 845 882 A2 | 6/1998 |
| JP | 10-163960 | 6/1998 |
| JP | 2003-069501 | 3/2003 |
| KR | 1020050005602 A | 1/2005 |
| KR | 1020050051997 A | 6/2005 |
| KR | 1020060027643 A | 3/2006 |

* cited by examiner

*Primary Examiner* — Dawayne A Pinkney
(74) *Attorney, Agent, or Firm* — Blakely, Sokoloff, Taylor & Zafman

(57) ABSTRACT

Provided is an automatic optical power control method for an optical line terminal (OLT) of a passive optical network (PON). The automatic optical power control method includes at the OLT, measuring an allowable range of the optical power allowing a normal network operation on the PON, at the OLT, setting an optimum optical signal level within the measured allowable range of the optical power, and at the OLT, adjusting a power level of a transmitter to the set optimum optical signal level. Accordingly, an appropriate power level can be selected depending on an optical distribution network (ODN) structure to drive the transmitter. Also, when the entire optical network units are deactivated, a laser of the transmitter is turned off to thereby minimize unnecessary power consumption at the OLT.

7 Claims, 4 Drawing Sheets

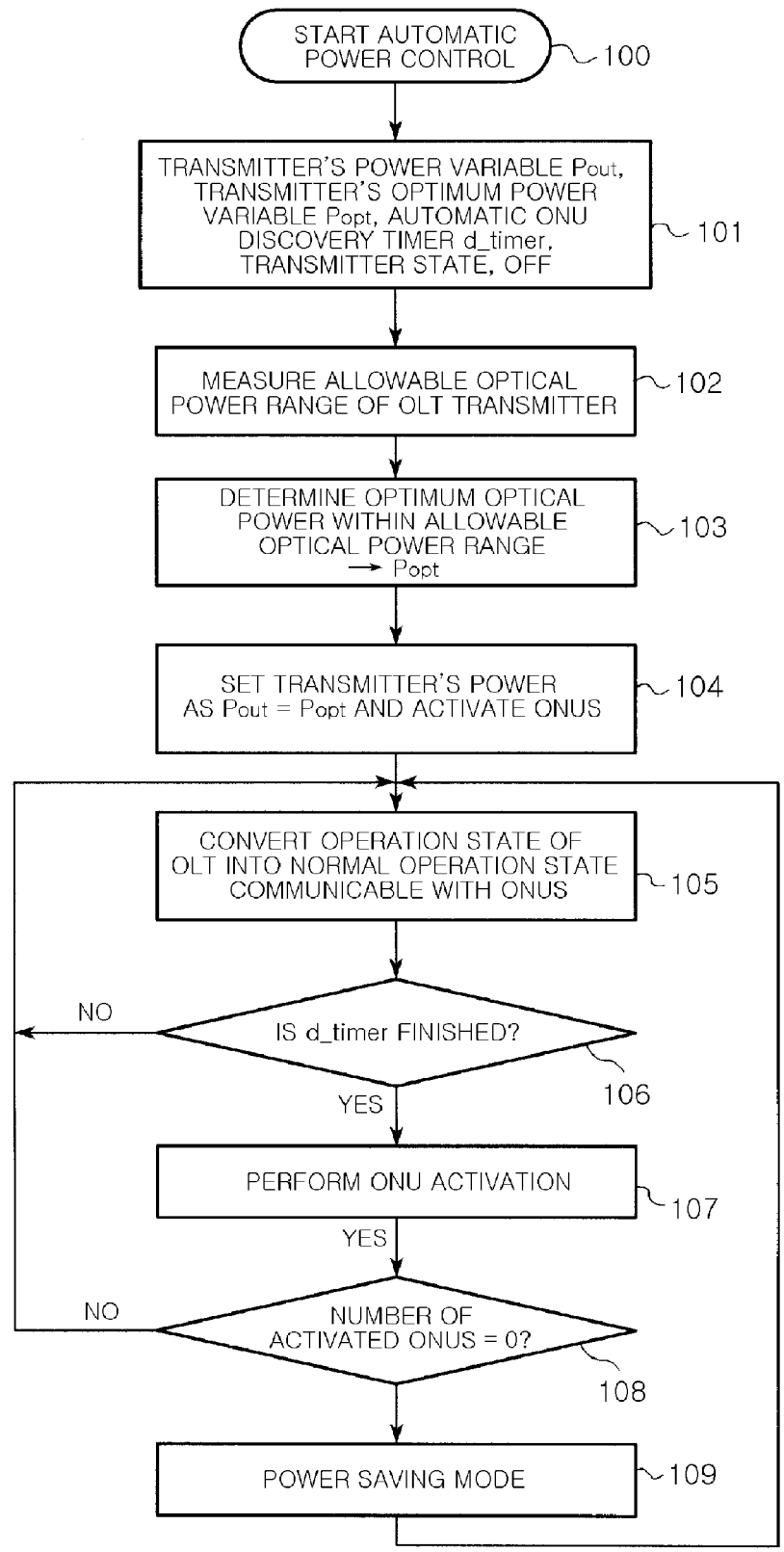

[Fig. 2]
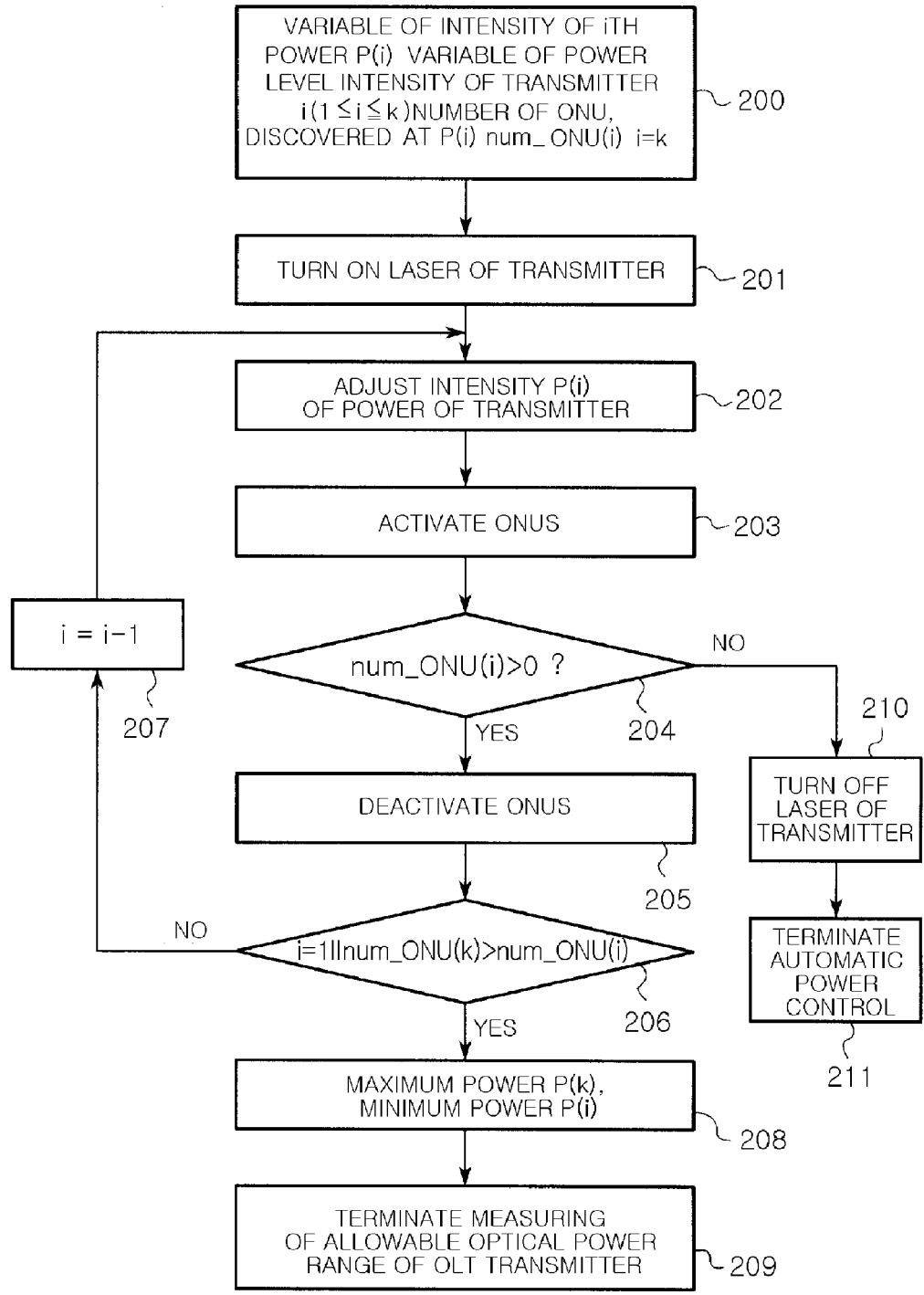

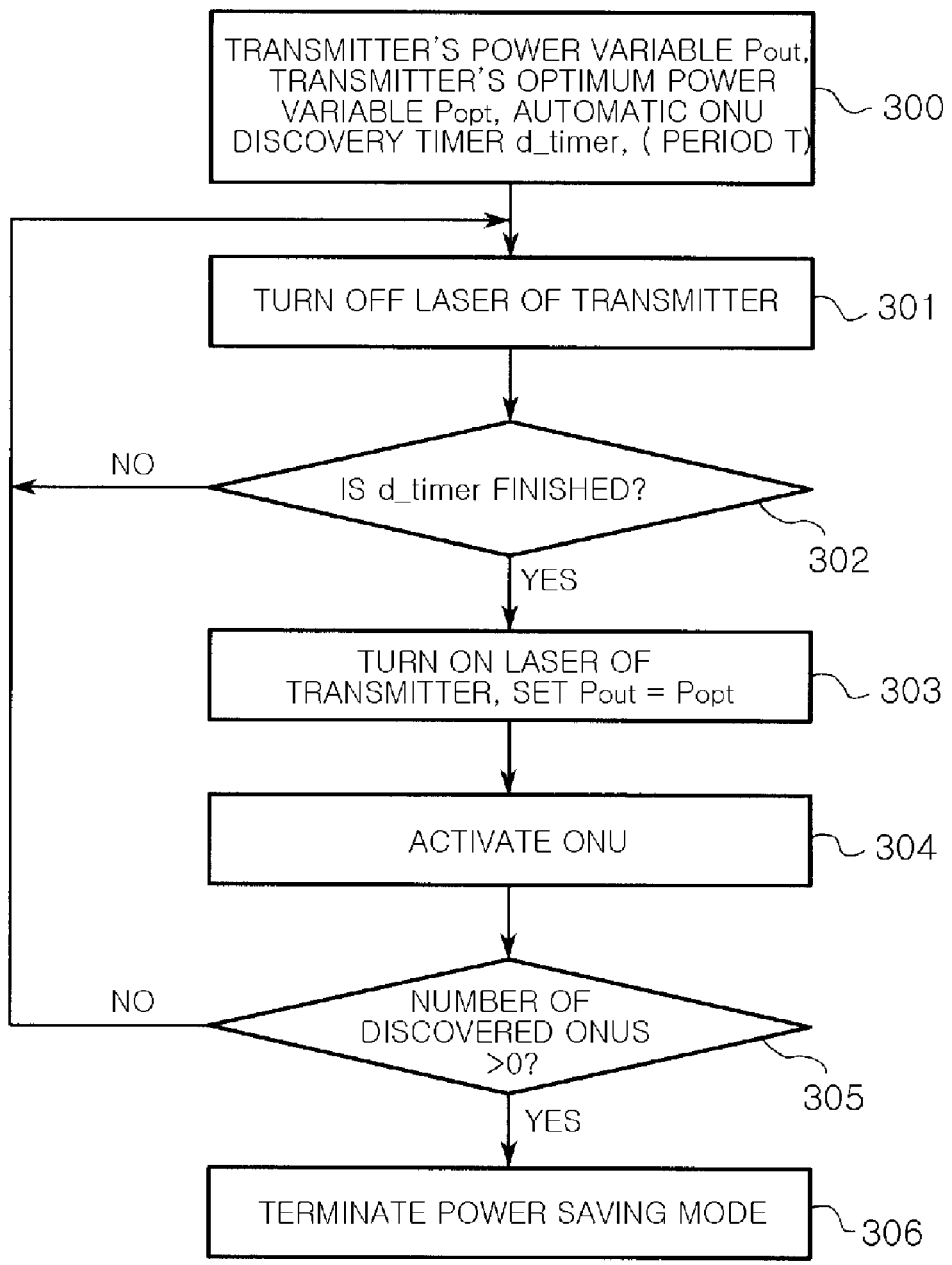
[Fig. 3]

[Fig. 4]
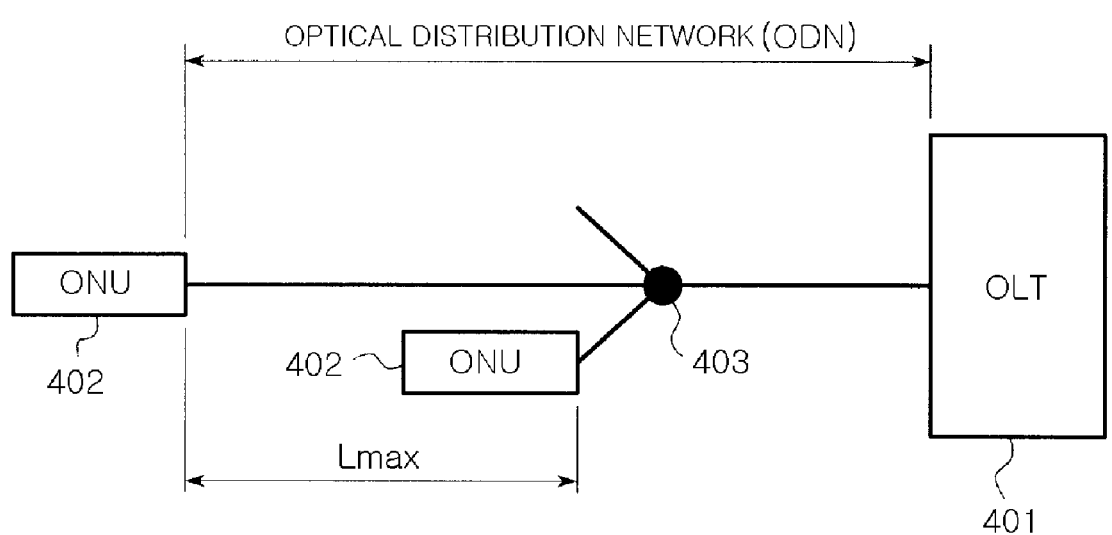

AUTOMATIC OPTICAL POWER CONTROL METHOD FOR OLT IN PON

This is a non-provisional application claiming the benefit of International application number PCT/KR2007/004678 filed Sep. 21, 2007.

TECHNICAL FIELD

The present invention relates to a passive optical network (PON) system based on a time division multiple access (TDMA) mode, and more particularly, to an automatic optical power control method for an optical line terminal (OLT) in a TDMA-based PON.

BACKGROUND ART

PON technology is one of the fiber-to-the home (FTTH) technologies suggested to effectively provide a necessary band for a subscriber terminal. As illustrated in FIG. 4, a conventional PON is usually configured in a point-to-multipoint structure in which a plurality of optical network units (ONUs) 402 commonly share one OLT 401 through a passive device such as an optical distributor 403. Standardization association groups including International Telecommunication Union-Telecommunication Standardization Sector (ITU-T) and Institute of Electrical and Electronics Engineers (IEEE) have standardized asynchronous transfer mode-passive optical network (ATM-PON), Ethernet passive optical network (E-PON) and Gigabit passive optical network (G-PON) as a FTTH network having such a PON structure.

An optical transfer network between the OLT 401 and the corresponding ONUs 402 is called an optical distribution network (ODN), and the ODN is configured in a tree structure.

If the ODN structure is formed in multiple steps, the OLT 401 and the individual ONUs 402 are spaced away from each other, or these two cases co-exist, a signal level is likely attenuated, and thus, maximum optical power is often required. For this reason, when data are transmitted from the OLT 401, it is generally mandated to use an optical signal at maximum power.

However, because of the characteristics of the PON, which can have various ODN structures and variable distances to the ONUs, an optical signal at maximum power is usually unnecessary in most cases. Even though all of the ONUs 402 connected to the OLT 401 turn off during the operation of the PON, the OLT 401 transmits the optical signal, thereby increasing unnecessary power consumption.

As one example of the conventional optical power control methods, Korean patent laid-open number 2005-0051997 disclosed on Jun. 2, 2005 in the name of "Remote Power Control Apparatus and Method for PON System" proposes a method and apparatus for remote controlling the intensity of a burst mode signal that ONUs transmit to an OLT in an E-PON. In detail, a signal intensity detector that detects the intensity of a received signal at a receiving unit of the OLT is provided to help the OLT to control an appropriate power intensity of an optical signal of each of the ONUs, so that the magnitude of the optical signal received at the OLT is uniform.

As another example, Korean patent laid-open number 2005-0005602 disclosed on Jan. 14, 2005 in the name of "Optical Signal Power Level Measuring Apparatus and OLT (Optical Line Termination) Having the Apparatus in Gigabit passive optical network" suggests an apparatus for measuring an optical signal power level in a G-PON and an OLT including the same apparatus. Due to the characteristics of the G-PON, optical power is adjusted when the optical power level of an ONU is out of a predetermined range, and not adjusted when the optical power level is within the pre-determined range. On the basis of this fact, the intensity of an optical signal is not measured precisely but compared with a predetermined critical level. If necessary, an indication signal for adjusting the power level is generated.

As described above, the optical power control in the typical PON proceeds by which the OLT adjusts the optical power at the ONU side to be in an appropriate range. Hence, a range of the optical signal that has to be processed at an OLT receiver decreases to reduce the power consumption and errors. However, optical power control at an OLT transmission side has not yet been suggested.

DISCLOSURE OF INVENTION

Technical Problem

The present invention has been made to solve the foregoing problems of the prior art and it is therefore an object of certain embodiments of the present invention to provide an automatic optical power control method for an OLT in a PON allowing minimum power consumption at the OLT.

Another object of the present invention is to provide an automatic optical power control method for an OLT in a PON controlling optical power by finding out an appropriate optical power level according to ODN structures different from each other and a distance between the OLT and an optical network by using software instead of hardware.

Further another object of the preset invention is to provide an automatic optical power control method for an OLT in a PON capable of reducing unnecessary power consumption when network devices connected to the OLT are deactivated during the operation of the network devices.

Technical Solution

According to an aspect of the present invention, there is provided a method for automatically controlling optical power in an OLT of a PON, the method comprising: measuring an allowable range of the optical power allowing a normal network operation on the PON, setting an optimum optical signal level within the measured allowable range of the optical power, and adjusting a power level of a transmitter to the set optimum optical signal level.

The method may further comprise performing an ONU activation procedure of discovering ONUs operating in every predetermined period and registering the discovered ONUs when the OLT operates, checking the number of the activated ONUs after the ONU activation procedure, and performing a power saving mode of turning off power of the transmitter if the number of the activated ONUs is 0.

It is to be understood that both the foregoing general description and the following detailed description of the present invention are exemplary and explanatory and are intended to provide further explanation of the invention as claimed.

Advantageous Effects

According to various embodiments of the present invention, in an OLT system based on a PON, particularly, a TDMA-based PON, an appropriate power level is selected according to an ODN structure of the corresponding PON, and an optical transmitter drives based on this selection. Furthermore, when all of the ONUs are not operating, a laser of the optical transmitter is turned off. As a result, unnecessary power consumption in the OLT can be minimized. Also, the power level of the OLT can be automatically controlled based on the operation of software without configuring an additional physical device or means, and thus, the automatic power level control can be implemented simply and cost-effectively in the conventional OLT.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a flowchart to illustrate an overall procedure of an automatic optical power control method according to an embodiment of the present invention;

FIG. 2 is a flowchart to illustrate a detailed procedure of measuring an allowable range of power in respect of the automatic optical power control method according to an embodiment of the present invention;

FIG. 3 is a operational flowchart to illustrate a detailed power saving procedure in respect of the automatic optical power control method according to an embodiment of the present invention; and FIG. 4 illustrates a configuration diagram of a typical PON.

BEST MODE FOR CARRYING OUT THE INVENTION

The present invention will now be described more fully hereinafter with reference to the accompanying drawings, in which preferred embodiments of the invention are shown. It should be noted that those known functions and configurations related to the present invention will not be described in detail if it is determined that the detailed de-scription thereof may make the scope of the present invention ambiguous.

Also, like reference numerals denote like elements throughout different drawings.

Hereinafter, a procedure of activating ONU(s) is the generally known mechanism applied to automatically discover the operating ONU(s) while being connected to a PON at an OLT side. Particularly, embodiments described herein are directed to adjust a power level of an OLT not to activate ONU(s) in order to automatically discover the ONUs. Thus, the ONU activation procedure will be not described in detail.

FIG. 1 is a flowchart to illustrate an overall procedure of an automatic optical power control for an OLT in a PON according to an embodiment of the present invention.

Particularly, an optical subscriber network with a TDMA-based PON structure will be mainly described in this embodiment illustrated in FIG. 1.

The automatic optical power control method includes measuring an allowable range of optical power of the OLT in the PON (i.e., "power ranging mode", and selecting an optimum optical signal level within the allowable range of the optical power of the OLT and operating the PON. The automatic optical power control method may further include minimizing the power consumption when all of the ONUs turn off while the PON is operating (i.e., "power saving mode".

With reference to FIG. 1, the automatic optical power control method will be described in detail.

As mentioned above, the automatic optical power control method according to the present embodiment is implemented in the OLT of the TDMA-based PON. In detail, the automatic optical power control takes place at a control block controlling the operation of the OLT. Power is first applied to the OLT to initialize a system. During this procedure, the automatic optical power control can be instigated by a command from a network operator.

In operation of 100, the automatic power control starts, and in operation of 101, variables necessary for the automatic power control and a state of an optical transmitter of the OLT are initialized.

The variables for the automatic power control include a variable $P_{out}$, a variable $P_{opt}$, and a timer variable d_timer. The variable $P_{out}$ indicates a power level of the OLT optical transmitter. The variable $P_{opt}$ indicates an optimum power level of the OLT optical transmitter, and the timer variable d_timer estimates a period for discovering one or more than one new ONU at the OLT. The timer variable d_timer is initialized in every certain period of time T, and provides information on an automatic discovery period T for the new ONU. The variables $P_{out}$ and $P_{opt}$ and the time variable d_timer are initialized to a value of '0'. The OLT optical transmitter is initialized to an off state in which an optical signal is not transmitted.

In operation of 102, an allowable range of optical power of the OLT in the current PON is measured. That is, the power ranging mode is performed. The allowable range of the optical power of the OLT is defined from a minimum power level at which power is in an on-state on the current PON, i.e., data can be transmitted to ONU(s) that can transmit and receive an optical signal to a maximum power level that the OLT optical transmitter can generate. A minimum power level of the allowable optical power range can be determined by repetitively performing an activation procedure of discovering one or more than one ONU while changing a power level of the optical transmitter and a deactivation procedure of canceling the discovered ONU(s) and comparing the number of the discovered ONU(s) at different power levels with each other. Preferably, the lowest power level at which the ONU(s) can be discovered as same as the number of the discovered ONU(s) at the maximum power level is set as the minimum power level. The operation 102 of measuring the allowable optical power range of the OLT will be better understood in FIG. 2.

After the allowable optical power range of the OLT is measured, in operation of 103, an optimum optical power level is selected within the measured allowable range of the optical power so as to be set as a value of the variable $P_{opt}$. If the optimum optical power level is set based on the minimum power level within the allowable optical power range, the optimum optical power level include an offset value for the ONU(s) added after the optical power is set according to the present embodiment. That is, the optimum optical power level is set as $P_{opt}$ (dBm)=P(i)+$P_{offset}$, where 'i' is a power level, wherein 1=i=k, k being the maximum power level. Herein, $P_{offset}$ is an offset power level for one or more than one ONU additionally connected to the PON after the optical power level of the OLT is set, and $P_{offset}$ (dBm) is defined as 'Lmax X 0.2 dBm' as shown in FIG. 4. The reference label 'Lmax' is a maximum allowable distance (in kilometers) between one ONU located at the shortest distance from the OLT and another ONU located at the longest distance from the OLT, and is specifically set for each PON. The reference label '0.2' dBm is an amount of attenuation per unit distance (e.g., 1 Km) of an optical signal transmitted through the generally known optical fibers. For instance, for the specification of the G-PON standardized by ITU-T, the maximum allowable distance between the ONU at the shorted distance and the other ONU at the longest distance is set as being approximately 20 Km, and in such a case, $P_{offset}$ can be specifically set as being approximately 4 dBm.

When the optimum power level is set based on calculation, if the $P_{opt}$ value calculated as above is greater than the maximum power level P(k) at the OLT, the optimum power level is preferably determined as being $P_{opt}=P(k)$.

In operation of 104, a power level of the optical transmitter is set as being the above determined $P_{opt}$. As similar to the general initial operation of the OLT, the ONU activation procedure is performed to discover one or more than one ONU connected to the PON. After the completion of the ONU activation procedure, data can be normally exchanged with the discovered ONU(s) in operation of 105. The OLT transmits data at the optimum optical power level determined in the previous operation of 103. According to these serial operations, the power level of the OLT is not set as the maximum optical power level, but in consideration of an ODN structure and the distance from the OLT to the corresponding ONU in the corresponding PON. As a result, unnecessary power consumption can be minimized and at the same time, stable communication with the corresponding ONU can be achieved.

Additional operation may be further performed to reduce the unnecessary power consumption caused by the ONU(s) when the power turns on or off during the normal network operation in the PON.

After the previous operation of 105, while the network operation is normally performed, it is checked whether the timer variable d_timer is finished in operation of 106.

When the timer variable d_timer is finished after the elapse of the predetermined time period T, in operation of 107, the ONU activation procedure is performed again to confirm again the ONU(s) currently connected to the PON.

In operation of 108, it is checked whether the number of the ONU(s) discovered after the previous operation of 107 is 0.

If the number of the ONU(s) is not 0, even if the number of the ONU(s) in the current PON is 1, it is determined as being in the operation. Thus, the optical transmitter of the OLT continuously performs the normal operation. On the contrary, if the number of the discovered ONU(s) is 0, it is determined there is no ONU operating in the current PON as like the case that one or more than one ONU turns off. Based on this determination, in operation of 109, the power saving procedure is performed to turn off a laser of the optical transmitter in order to reduce the unnecessary power consumption. Preferably, if one of the ONUs is connected to the current PON while in the power saving mode, the ONU activation procedure is performed by truing on the laser of the optical transmitter periodically to allow the normal operation. If one of the ONUs is discovered after the ONU activation procedure, the power saving mode is terminated, and the operation 105 resumes, that is, the normal network operation is performed. A flow of the operation at the power saving mode will be described in FIG. 3.

As described above, by performing the operations 106 to 109, depending on the on or off state of the ONU(s), the OLT turns off the laser of the optical transmitter consuming the greatest power when all of the ONUs do not operate during the network operation, so that unnecessary power consumption can be minimized.

FIG. 2 is a detailed flowchart to illustrate the operation 102 of measuring an allowable optical power level range for the automatic optical power control method described in FIG. 1.

In the automatic optical power control method according to the present embodiment, those necessary variables for measuring the allowable range of the optical power are set and initialized in operation of 200 to measure the allowable range of the optical power.

The necessary variables include a variable P(i) and a variable num_ONU(i). The variable P(i) indicates the intensity of an ith power level when a range of power that the optical transmitter of the OLT can generate is expressed in sequence. The variable num_ONU(i) sets the power of the optical transmitter of the OLT as the variable P(i) and indicating the number of the ONU(s) discovered while the ONU activation procedure is performed. Herein, 'i' denotes a value equal to or greater than 1 and equal to or less than k (i.e., 1=i=k), and 'k' denotes a maximum power level that the optical transmitter of the OLT can generate. Referring to these variables, the optical transmitter of the OLT can generate the power at approximately k level, and the variable P(k) can be explained as being the maximum power at the optical transmitter. Additionally, in operation of 200, 'i' is initialized to 'k'

In operation of 201, the optical transmitter of the OLT turns on, and in operation of 202, the intensity of the power of the optical transmitter is adjusted at the variable P(i). At this time, since the 'i' is initialized to 'k' if the laser of the optical transmitter drives for the first time, the intensity of the power of the optical transmitter is adjusted to the maximum power.

In operation of 203, the ONU activation procedure is performed to automatically discover one or more than one ONU using the optical transmitter whose power level is adjusted at the variable P(i), and the number of the discovered ONU(s) is stored as the variable num_ONU(i).

In operation of 204, when the power level is at the P(i), it is checked whether the number num_ONU(i) of the discovered ONU(s) is 0 or not.

If the variable num_ONU(i) is 0, especially, when i=k and the number of the discovered ONU(s) is 0, there is no operating ONU. Thus, in operation of 210, the laser of the optical transmitter is turned off, and in operation of 211, the automatic optical power control procedure is finished without further operations.

If the number num_ONU(i) of the discovered ONU(s) is greater than 1, in operation of 205, a deactivation procedure in which all of the registered ONU(s) in the previous operation of 203 are canceled is performed.

Furthermore, in operation of 206, it is checked whether the current value of 'i' is 1, or the number of the discovered ONU(s) at the power level of the current variable P(i) is less than that of the discovered ONUs at the maximum power level of the variable P(k) (i.e., num_ONU(k)>num_ONU(i)).

If the above two conditions checked in the previous operation 206 are not satisfied, a value of 'i' is decreased by 1 in operation of 207, the operation 202 resumes.

In contrast, if one of the two conditions is satisfied, in operation of 208, the maximum allowable optical power is set as the maximum power P(k) that the optical transmitter of the OLT can generate, and the minimum allowable optical power level is set as the current power level P(i). Afterwards, in operation of 209, the procedure of measuring the allowable range of the optical power level of the OLT is finished.

FIG. 3 is a detailed flowchart to illustrate the operation of performing the power saving mode described in FIG. 1.

After the operation 109, in operation of 300, variables necessary for performing the power saving mode are set. The variables include a variable $P_{out}$, a variable $P_{opt}$, a variable d_timer. The variable $P_{out}$ is indicative of a power level of the current optical transmitter, and the variable $P_{opt}$ is indicative of an optimum power level. The variable d_timer is an automatic ONU discovery timer variable for checking the connection of the ONU(s) to the PON. The variable $P_{opt}$ is a value set in the previous operation 103, and the variable d_timer is set in every period of T. The variable d_timer is to check the period of confirming the connection or disconnection of the ONU(s) to the PON to perform the normal network operation when even one of the ONUs is connected thereto according to an on or off sate of the ONU(s) while in the power saving mode.

In operation of 301, the laser of the optical transmitter is turned off to save power, and in operation of 302, the off-state of the laser is sustained until the variable d_timer is finished.

When the period reaches a value of T as the variable d_timer is finished, in operation of 303, the laser of the optical transmitter is turned on, and the power level $P_{out}$ is set as the optimum power level $P_{opt}$. In operation of 304, the ONU activation procedure is performed again to discover the ONU(s).

After the completion of the ONU activation procedure, in operation of 305, it is checked whether the number of the discovered ONU(s) due to the ONU activation procedure is 0. If no ONU is discovered, the operation 301 resumes, so that the power saving mode is sustained.

In contrast, if the number of the discovered ONU(s) is not 0, meaning that one of the ONUs is newly connected to the PON, in operation of 306, the power saving mode is terminated to run the normal network operation. The operation 105 described in FIG. 1 resumes.

While the power saving mode is sustained, the operations of 301 to 305 are repetitively performed.

The above described automatic optical power control method can be implemented using software in the OLT system without configuring hardware additionally.

While the present invention has been described with reference to the particular illustrative embodiments and the accompanying drawings, it is not to be limited thereto but will be defined by the appended claims. It is to be appreciated that those skilled in the art can substitute, change or modify the embodiments into various forms without departing from the scope and spirit of the present invention.

The invention claimed is:

1. A method for automatically controlling optical power in an OLT (optical line terminal) of a PON (passive optical network), the method comprising the steps of:
   measuring an allowable range of the optical power allowing a normal network operation on the PON;
   setting an optimum optical signal level within the measured allowable range of the optical power;
   adjusting a power level of a transmitter to the set optimum optical signal level, wherein the setting an optimum optical signal level comprises:
   setting the optimum optical signal level at a minimum power level within the allowable range of the optical power;
   adding the set optimum optical signal level and an offset power level for ONUs to be additionally connected to the PON, wherein the offset power level is defined as a fraction of transmission power times a maximum allowable distance between an ONU located at the shortest distance from the OLT and an ONU located at the longest distance from the OLT in the corresponding PON;
   performing an ONU (optical network unit) activation procedure of discovering ONUs operating in every predetermined period and registering the discovered ONUs when the OLT operates; checking the number of the activated ONUs after the ONU activation procedure; and performing a power saving mode of turning off power of the transmitter if the number of the activated ONUs is O.

2. The method according to claim 1 wherein the measuring an allowable range of the optical power comprises initiating the measurement in response to a command from an operator when the power is initially applied to the OLT and the OLT performs an initialization procedure starting.

3. The method according to claim 1, wherein the measuring an allowable range of the optical power comprises:
   performing the ONU activation procedure of discovering the ONUs for each power level; and
   determining the allowable range of the optical power as being defined from a minimum power level at which the number of the discovered ONUs is substantially the same as that of the discovered ONUs at a maximum power level that the transmitter can generate to the maximum power level.

4. The method according to claim 1, wherein the offset power level is defined as 'Lmax [Km]×0.2 dBm' and the 'Lmax' being the maximum allowable.

5. The method according to claim 1, wherein the performing a power saving mode comprises: performing an activation procedure of turning on a laser of the transmitter in every period to discover the ONUs;
   checking whether the number of the ONUs discovered at the activation procedure is 0; and
   turning off the laser of the transmitter if the number of the discovered ONUs is 0, and terminating the power saving mode if the number of the discovered ONUs is not 0.

6. The method according to claim 1, wherein the measuring an allowable range of the optical power comprises: setting variables P(i) and num_ONU(i) and initializing the 'i' to 'k' wherein the variable P(i) indicates the intensity of an ith power and the variable numONU(i) indicates the number of the discovered ONUs at the power level of P(i), where 1<i<k, k being the maximum power level that the transmitter generates;
   adjusting the power level of the transmitter to the variable P(i);
   performing an activation procedure of discovering the ONUs through the transmitter having the adjusted power level of P(i) and storing the number of the discovered ONUs as the variable num_ONU(i);
   performing a deactivation procedure of canceling the registration of the discovered ONUs;
   checking whether the is 1, or the number num_ONU(i) of the ONUs discovered at the power level of P(i) is less than the number num_ONU(k) of the ONUs discovered at the maximum power level of P(k);
   decreasing the 'i' by 1 if the is not 1 and the number num_ONU(i) of the discovered ONUs at the power level of P(i) is not less than the number num_ONU(k) of the ONUs discovered at the maximum power level of P(k) and performing again the adjusting the power level of the transmitter to the variable of P(i); and
   setting the allowable range of the optical power as being in a range of P(i) to P(k) if the 'i' is 1 or the number num_ONU(i) of the discovered ONUs at the power level of P(i) is less than the number num_ONU(k) of the ONUs discovered at the maximum power level of P(k).

7. The method according to claim 6, wherein the measuring an allowable range of the optical power further comprises:
   checking whether the number of the discovered ONUs is 0 when the activation procedure is performed while the power level of the transmitter is adjusted to the variable of P(k); and
   terminating the control of the optical power of the transmitter if the number of the discovered ONUs is 0.

* * * * *